United States Patent
Zhang et al.

(10) Patent No.: US 10,972,926 B2
(45) Date of Patent: Apr. 6, 2021

(54) MECHANISM TO SUPPORT RRM MEASUREMENT IN NEW RADIO ACCESS SYSTEM WITH BEAMFORMING

(71) Applicant: MEDIATEK Singapore Pte. Ltd, Singapore (SG)

(72) Inventors: Yuanyuan Zhang, Beijing (CN); Chia-Hao Yu, Yilan County (TW); Li-Chuan Tseng, Hsinchu (TW); Ming-Po Chang, New Taipei (TW)

(73) Assignee: MediaTek Singapore Pte Ltd., Singapore (SG)

( * ) Notice: Subject to any disclaimer, the term of this patent is extended or adjusted under 35 U.S.C. 154(b) by 0 days.

(21) Appl. No.: 16/247,567

(22) Filed: Jan. 15, 2019

(65) Prior Publication Data
US 2019/0150009 A1 May 16, 2019

Related U.S. Application Data

(63) Continuation of application No. PCT/CN2016/094940, filed on Aug. 29, 2016.

(51) Int. Cl.
*H04W 24/08* (2009.01)
*H04B 7/08* (2006.01)
(Continued)

(52) U.S. Cl.
CPC .......... *H04W 24/08* (2013.01); *H04B 7/0695* (2013.01); *H04B 7/088* (2013.01); *H04W 16/28* (2013.01); *H04W 84/042* (2013.01)

(58) Field of Classification Search
CPC ... H04W 24/08; H04W 16/28; H04W 84/042; H04B 7/0695; H04B 7/088
See application file for complete search history.

(56) References Cited

U.S. PATENT DOCUMENTS

2005/0176468 A1* 8/2005 Iacono .......... H04B 7/0871 455/562.1
2012/0058729 A1 3/2012 Chang et al. .......... 455/63.1
(Continued)

FOREIGN PATENT DOCUMENTS

| CN | 105340132 A | 2/2014 |
| CN | 105830483 A | 8/2016 |

(Continued)

OTHER PUBLICATIONS

International Search Report and Written Opinion of International Search Authority for PCT/CN2016/094940 dated May 8, 2017 (11 pages).

(Continued)

*Primary Examiner* — Kyaw Z Soe
(74) *Attorney, Agent, or Firm* — Imperium Patent Works; Helen Mao; Zheng Jin

(57) ABSTRACT

Apparatus and methods are provided to for RRM measurement in the new radio (NR) access system. In one novel aspect, multiple transmission (TX) beams are measured by a user equipment (UE) with multiple receiving (RX) beams, stores the measured TX-RX pair in a measurement matrix, and calculates a consolidation measurement for each cell based on a consolidation rule. In one embodiment, the consolidation rule indicates generating a RX consolidated vector by consolidating all RX beams with the same TX beam ID, and subsequently, generating the consolidation measurement for the cell based on the RX consolidated vector. In another embodiment, the measurement matrix is layer-3 filtered and consolidated. In yet another embodiment, the UE sends a measurement report, either contains the consolidated measurement or the measurement vector, to the NR network based on the consolidation measurement. In (Continued)

one embodiment, the network performs consolidation on the received measurement vector.

22 Claims, 10 Drawing Sheets

(51) Int. Cl.
*H04B 7/06* (2006.01)
*H04W 16/28* (2009.01)
*H04W 84/04* (2009.01)

(56) References Cited

U.S. PATENT DOCUMENTS

| | | | |
|---|---|---|---|
| 2012/0202431 A1 | 8/2012 | Hawryluck et al. | 455/63.4 |
| 2013/0121185 A1* | 5/2013 | Li | H04W 24/10 370/252 |
| 2014/0010178 A1* | 1/2014 | Yu | H04W 74/0833 370/329 |
| 2015/0282122 A1* | 10/2015 | Kim | H04B 7/0695 370/329 |
| 2015/0289147 A1* | 10/2015 | Lou | H04B 7/0452 370/329 |
| 2015/0333811 A1 | 11/2015 | Yu et al. | 370/329 |
| 2017/0195998 A1 | 7/2017 | Zhang et al. | |
| 2017/0214444 A1* | 7/2017 | Nigam | H04B 7/0634 |
| 2017/0325244 A1 | 11/2017 | Zhang et al. | |
| 2019/0104549 A1* | 4/2019 | Deng | H04B 7/0617 |

FOREIGN PATENT DOCUMENTS

| | | |
|---|---|---|
| WO | WO2016086144 | 6/2016 |
| WO | WO2016115710 A1 | 7/2016 |

OTHER PUBLICATIONS

EPO, search report for the EP patent application 16912379.1 dated Jul. 19, 2019 (8 pages).
SIPO, Office Action for the CN patent application 201680050649.1 (no English translation is available) dated Aug. 25, 2020 (7 pages).
R2-162226 3GPP TSG RAN WG2 #93bis, Samsung, "Discussion on Beam Measurement and Tracking for 5G New Radio Interface in mmWave Frequency Bands", Dubrovnik, Croatia, Apr. 11-15, 2016 (7 pages).

* cited by examiner

MECHANISM TO SUPPORT RRM MEASUREMENT IN NEW RADIO ACCESS SYSTEM WITH BEAMFORMING

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2016/094940, with an international filing date of Aug. 29, 2016. This application is a continuation of International Application No. PCT/CN2016/094940. International Application No. PCT/CN2016/094940 is pending as of the filing date of this application, and the United States is a designated state in International Application No. PCT/CN2016/094940. The disclosure of each of the foregoing documents is incorporated herein by reference.

FIELD OF INVENTION

The disclosed embodiments relate generally to wireless communication, and, more particularly, to radio resource management (RRM) measurement in a high frequency (HF)/new radio (NR) wireless system.

BACKGROUND OF THE INVENTION

The bandwidth shortage increasingly experienced by mobile carriers has motivated the exploration of the underutilized high frequency (HF) spectrum between ranges up to 100 GHz for the next generation broadband cellular communication networks. The new radio (NR) access technology is being developed with broad range of use cases and requirements. The available spectrum of HF is two hundred times greater than the conventional cellular system. The NR wireless network uses directional communications with narrow beams and can support multi-gigabit data rate. The underutilized bandwidth of the NR/HF spectrum has wavelengths ranging from 1 mm to 100 mm. The very small wavelengths of the HF spectrum enable large number of miniaturized antennas to be placed in a small area. Such miniaturized antenna system can produce high beamforming gains through electrically steerable arrays generating directional transmissions.

With recent advances in HF semiconductor circuitry, HF wireless system has become a promising solution for the real implementation. However, the heavy reliance on directional transmissions and the vulnerability of the propagation environment present particular challenges for the HF network. For example, HF channel changes much faster than today's cellular system due to the small coherence time, which is about hundreds of microseconds. The HF communication depends extensively on adaptive beamforming at a scale that far exceeds current cellular system. Further, on the receiver side, the mobile devices can receive the multiple TX beams with multiple receiving (RX) beams. As a result, the measurement of the NR system increased because each TX beam will be paired with multiple RX beams for one measurement. The multiple RX-TX pairs each generate different measurement. How to consolidate and reporting the measurement result requires new consideration. Due to the largely increased amount of measurement data, efficient ways of handling measurement results are required.

Improvements and enhancements are required to support radio resource management (RRM) measurement in the HF/NR wireless network.

SUMMARY OF THE INVENTION

Apparatus and methods are provided for RRM measurement in the new radio (NR) access system. In one novel aspect, multiple transmission (TX) beams are measured by a user equipment (UE) with multiple receiving (RX) beams. The UE stores the measured TX-RX pair in a measurement matrix, and calculates a consolidation measurement for each cell based on a consolidation rule. In one embodiment, the consolidation rule indicates generating a RX consolidated vector for a cell by consolidating all RX beams with the same TX beam ID, and subsequently, generating the consolidation measurement for the cell based on the RX consolidated vector. In another embodiment, the measurement matrix is layer-3 filtered and consolidated. In one embodiment, the consolidation rule is selected from a set of matrix consolidation rules comprising: selecting the measurement result of a TX-RX pair with the best RSRP, a number of TX-RX pairs with corresponding measurement result above a threshold, a mean value of the measurement results for all TX-RX pairs for corresponding cell, a sum value of the measurement results for all TX-RX pairs for corresponding cell. In one embodiment, the consolidation is a joint consolidation, which performs a consolidation on all the TX-RX pair measurement based on a consolidation rule. In one embodiment selecting the TX beam for consolidation based on the network decision and input. In one embodiment, only the measurement result of the serving beam in the single connectivity is used. The serving beam is determined by the network and beam switching is commanded by the network. Based on the switching command, the UE picks the measurement result in the vector according to the serving beam ID. In yet another embodiment, the consolidation rules for the serving cell and the neighboring cells are different.

In one novel aspect, the UE sends a measurement report, contains the consolidated measurement or the measurement vector, to the NR network based on the consolidation measurement. In one embodiment, one consolidated result is contained in the measurement report for each cell. In another embodiment, a consolidated vector is included in the measurement report to the network. In one embodiment, the network performs consolidation on the received measurement vector. The UE subsequently receives a consolidated value for each cell from the network. The received consolidated value is generated by the NR network based on the measurement vector in the measurement report.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
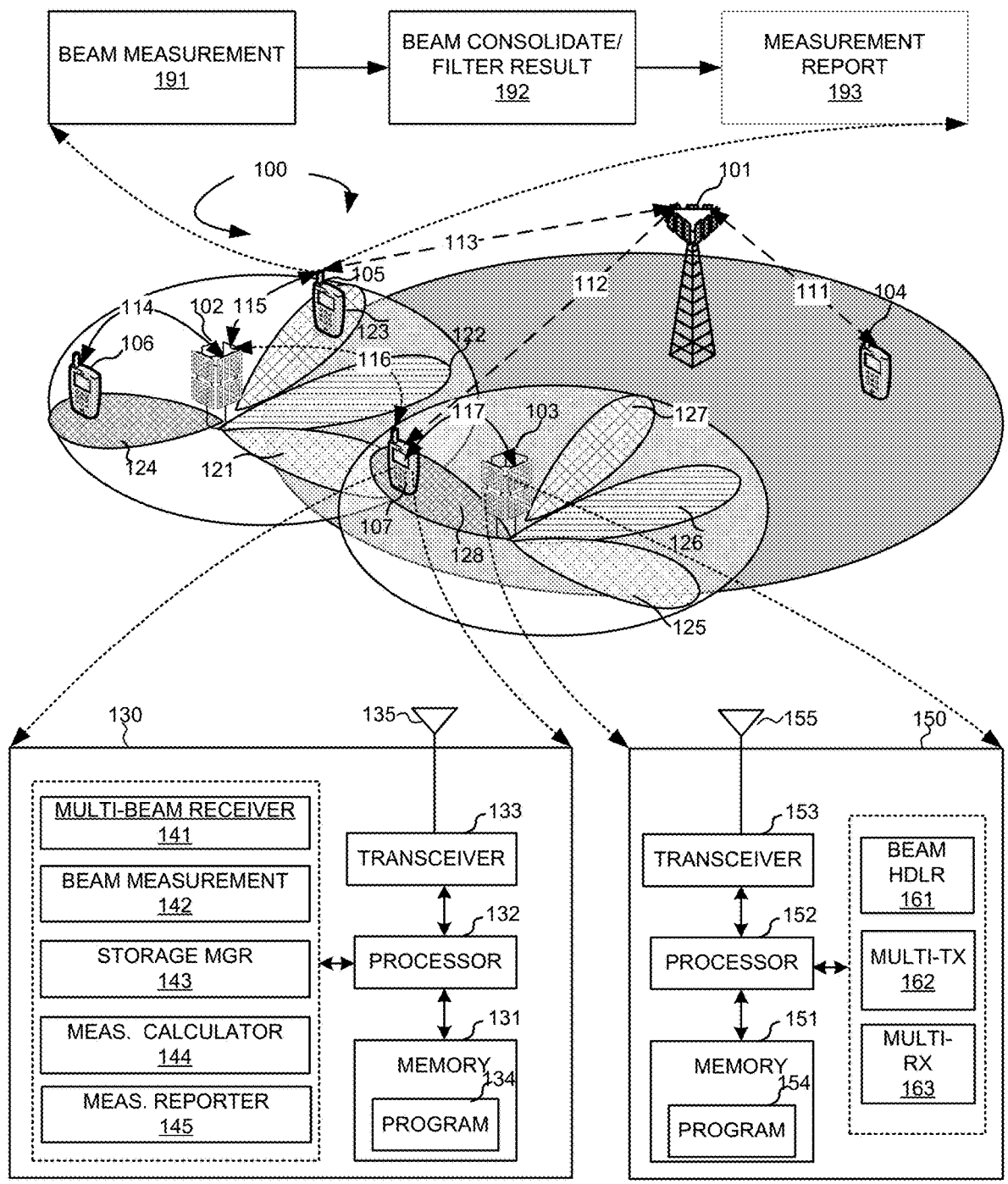
FIG. 1 is a schematic system diagram illustrating an exemplary wireless network with HF connections in accordance with embodiments of the current invention.

FIG. 1 is a schematic system diagram illustrating an exemplary wireless network 100 with HF connections in accordance with embodiments of the current invention. Wireless system 100 includes one or more fixed base infrastructure units forming a network distributed over a geographical region. The base unit may also be referred to as an access point, an access terminal, a base station, a Node-B, an eNode-B, or by other terminology used in the art. As an example, base stations 101, 102 and 103 serve a number of mobile stations 104, 105, 106 and 107 within a serving area, for example, a cell, or within a cell sector. In some systems, one or more base stations are coupled to a controller forming an access network that is coupled to one or more core networks. eNB 101 is a conventional base station served as a macro eNB. eNB 102 and eNB 103 are HF base station, the serving area of which may overlap with serving area of eNB 101, as well as may overlap with each other at the edge. If the serving area of HF eNB does not overlap the serving area of macro eNB, the HF eNB is considered as standalone, which can also provide service to users without the assistance of macro eNB. HF eNB 102 and HF eNB 103 has multiple sectors each with multiple control beams to cover a directional area. Control beams 121, 122, 123 and 124 are exemplary control beams of eNB 102. Control beams 125, 126, 127 and 128 are exemplary control beams of eNB 103. As an example, UE or mobile station 104 is only in the service area of eNB 101 and connected with eNB 101 via a link 111. UE 106 is connected with HF network only, which is covered by control beam 124 of eNB 102 and is connected with eNB 102 via a link 114. UE 105 is in the overlapping service area of eNB 101 and eNB 102. In one embodiment, UE 105 is configured with dual connectivity and can be connected with eNB 101 via a link 113 and eNB 102 via a link 115 simultaneously. UE 107 is in the service areas of eNB 101, eNB 102, and eNB 103. In embodiment, UE 107 is configured with dual connectivity and can be connected with eNB 101 with a link 112 and eNB 103 with a link 117. In embodiment, UE 107 can switch to a link 116 connecting to eNB 102 upon connection failure with eNB 103.

FIG. 1 further illustrates simplified block diagrams 130 and 150 for UE 107 and eNB 103, respectively. Mobile station 107 has an antenna 135, which transmits and receives radio signals. A RF transceiver module 133, coupled with the antenna, receives RF signals from antenna 135, converts them to baseband signal, and sends them to processor 132. RF transceiver module 133 is an example, and in one embodiment, the RF transceiver module comprises two RF modules (not shown), first RF module is used for HF transmitting and receiving, and another RF module is used for different frequency bands transmitting and receiving which is different from the HF transceiving. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107. Mobile station 107 also includes multiple function modules that carry out different tasks in accordance with embodiments of the current invention. A multiple beam receiver 141 receives each TX beam with multiple receiving (RX) beamforming. A beam measurement handler 142 measures multiple TX beams with multiple RX beams. A measurement storage manager 143 stores measurement results for all TX-RX pairs of each corresponding cell in a measurement matrix for the corresponding cell indexed by corresponding TX beam identification (ID) and RX beam ID. A measurement calculator 144 calculates a consolidation measurement for each cell from one or more qualified TX-RX pairs based on a consolidation rule. In one embodiment, UE 107 comprises a measurement reporter 145 generates a measurement report based the consolidated measurement result and sends the measurement report to the NR network.

Similarly, eNB 103 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 103.

Memory 151 stores program instructions and data 154 to control the operations of eNB 103. eNB 103 also includes multiple function modules that carry out different tasks in accordance with embodiments of the current invention. A beam handler 161 handles beam switching and beam alignment procedures. A multi-TX beam processor 162 manages multiple beam TX beams. A multi-RX beam processor 163 manages communication and processing of multi-RX beams function of UEs.

FIG. 1 further shows functional procedures that handle intermittent disconnections of the HF system. UE 105 has a beam measurement procedure 191, a beam consolidation and filtering result procedure 192, and a measurement report procedure 193.

Figure 2:
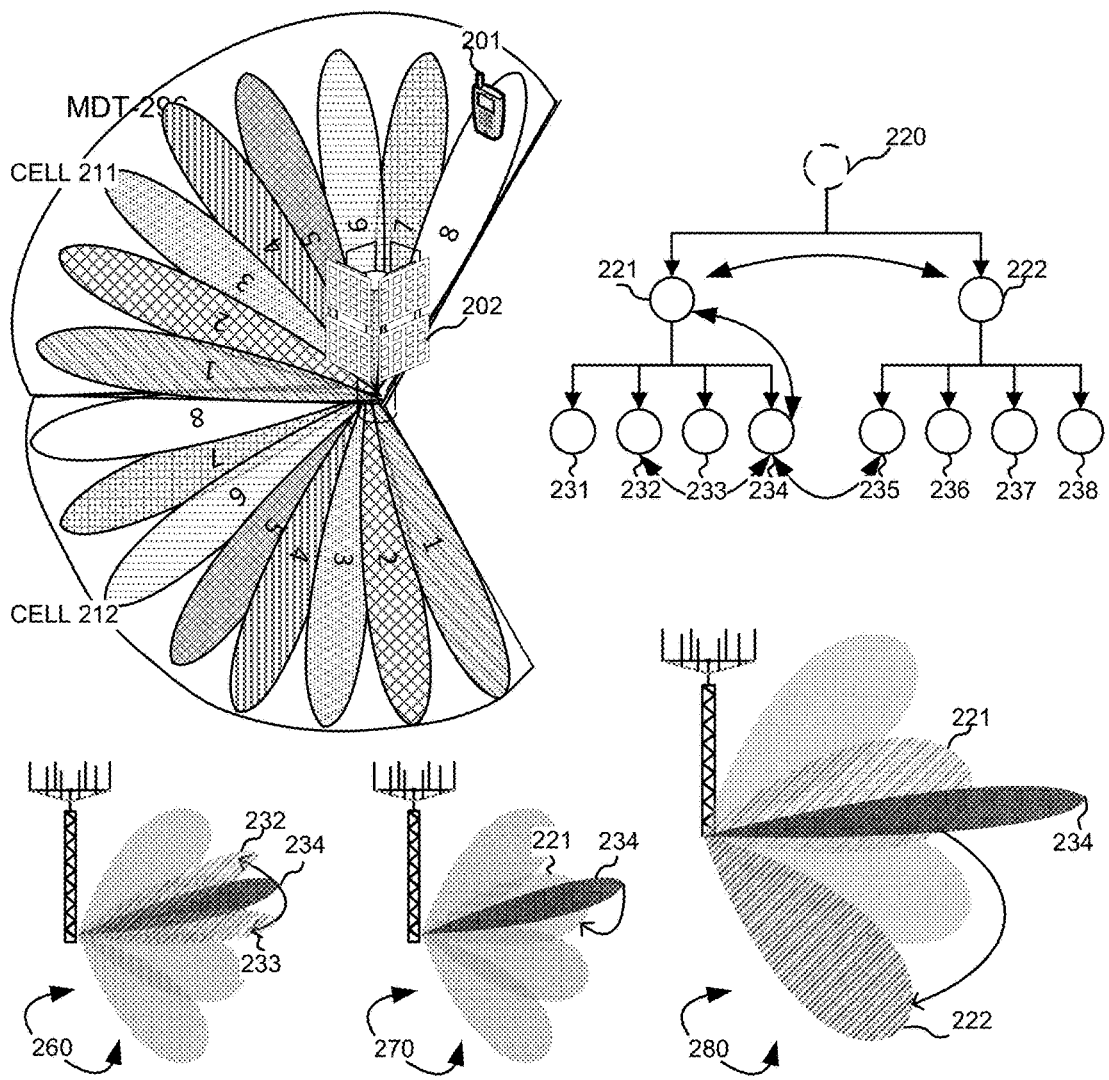
FIG. 2 illustrates an exemplary HF wireless system with multiple control beams and dedicated beams in multiple directionally configured cells.

FIG. 2 illustrates an exemplary HF wireless system with multiple control beams and dedicated beams in multiple directionally configured cells. A UE 201 is connected with an HF eNB 202. HF eNB 202 is directionally configured with multiple sectors/cells. Each sector/cell is covered by a set of coarse TX control beams. As an example, cells 211 and 222 are configured cells for HF eNB 202. In one example, three sectors/cells are configured, each covering a 120° sector. In one embodiment, each cell is covered by eight control beams. Different control beams are time division multiplexed (TDM) and distinguishable. Phased array antenna is used to provide a moderate beamforming gain. The set of control beams is transmitted repeatedly and periodically. Each control beam broadcasts the cell-specific information such as synchronization signal, system information, and beam-specific information. Besides coarse TX control beams, there are multiple dedicated beams, which are finer-resolution BS beams.

Beam tracking is an important function for the HF mobile stations. Multiple beams, including coarse control beams and dedicated beams are configured for each of the directionally configured cells. The UE monitors the qualities of its neighboring beams by beam tracking. FIG. 2 illustrates exemplary beam tracking/switching scenarios. A cell 220 has two control beams 221 and 222. Dedicated beams 231, 232, 233 and 234 are associated with control beam 221. Dedicated beams 235, 236, 237 and 238 are associated with control beam 222. In one embodiment, the UE connected via beam 234, monitors its neighboring beams for control beam 234. Upon a beam-switching decision, the UE can switch from beam 234 to beam 232 and vice versa. In another embodiment, the UE can fall back to control beam 221 from dedicated beam 234. In yet another embodiment, the UE also monitors dedicated beam 235 configured for control beam 222. The UE can switch to dedicated beam 235, which belongs to another control beam.

FIG. 2 also illustrates three exemplary beam-switching scenarios 260, 270 and 280. UE 201 monitors neighboring beams. The sweeping frequency depends on the UE mobility. The UE detects dropping quality of the current beam when the current beam quality degrades by comparing with coarse resolution beam quality. The degradation may be caused by tracking failure, or the channel provided by refined beam is merely comparable to the multipath-richer channel provided by the coarse beam. Scenario 260 illustrates the UE connected with dedicated beam 234 monitors its neighboring dedicated beams 232 and 233, which are all associated to its control beam, i.e. control beam 221. The control beam 221 is the serving beam, which is used as the anchor beam for data transmission over dedicated beam 234. The UE can switch to beam dedicated 232 or 233. Scenario 270 illustrates the UE connected with dedicated beam 234 can fall back to the control beam 221. Scenario 280 illustrates the UE connected with 234 associated with control beam 221 can switch to another control beam 222.

In one embodiment, the UE, on the receiving side, is also configured with multiple receiving beams. The multiple RX beams together with the multiple TX beams generate a larger amount of measurements, which enables the UE to have more receiving gains. Such technology also requires better RRM beam measurement design.

Figure 3:
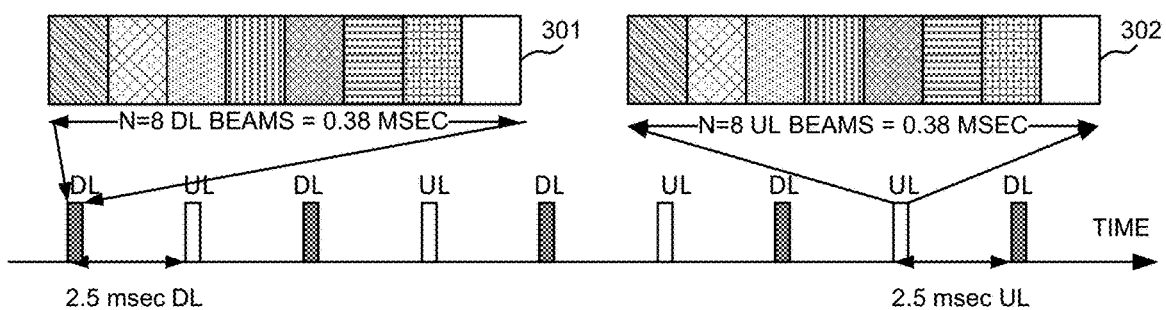
FIG. 3 illustrates an exemplary control beam configuration for UL and DL of the UE in accordance with the current invention.

FIG. 3 illustrates an exemplary control beam configuration for UL and DL of the UE in accordance with the current invention. A control beam is a combination of downlink and uplink resources. The linking between the beam of the DL resource and the beam of the UL resources is indicated explicitly in the system information or beam-specific information. It can also be derived implicitly based on some rules, such as the interval between DL and UL transmission opportunities. In one embodiment, A DL frame 301 has eight DL beams occupying a total of 0.38 msec. A UL frame 302 has eight UL beams occupying a total of 0.38 msec. The interval between the UL frame and the DL frame is 2.5 msec.

In a multi-TX beam and multi-RX beam NR system, the UE RX beams needs to align with the base station (BS) TX beams. In principle, the UE-side beam alignment is performed before BS-beam alignment. An uplink (UL) feedback channel for indicating downlink (DL) reception situation is required for BS beam administration. It can be combined with other frequency signaling. In one novel aspect, the UE performs measurement on each TX-RX beam pair. For example, if there are M TX beams and N RX beams, the UE performs M*N times of measurement and generates M*N TX-RX pair measurements.

Figure 4A:
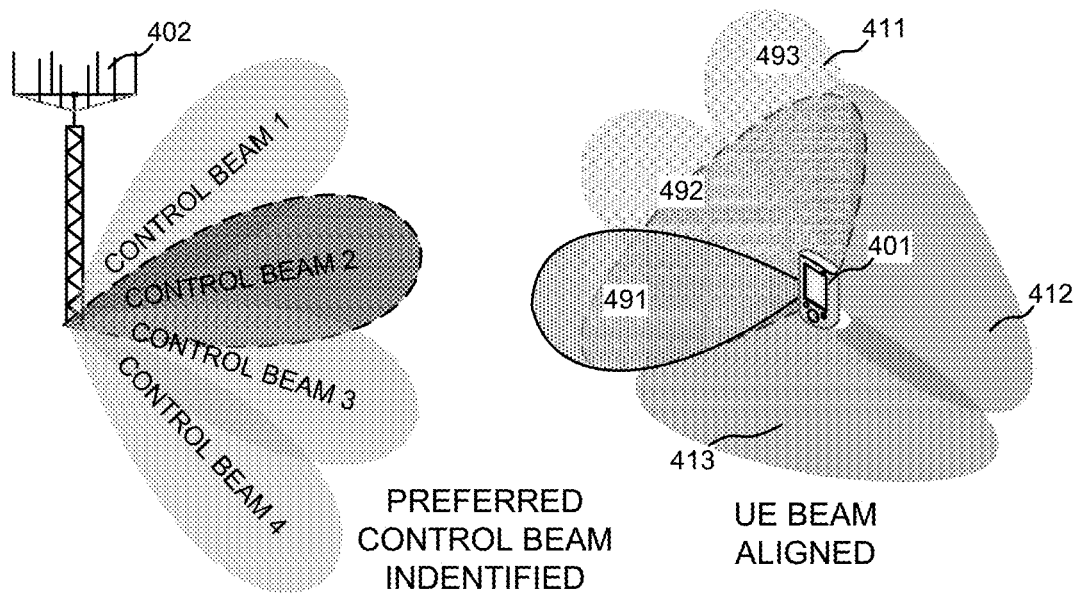
FIG. 4A illustrates exemplary beam manage for multiple TX-RX beams where the preferred control beam being identified.
Figure 4B:
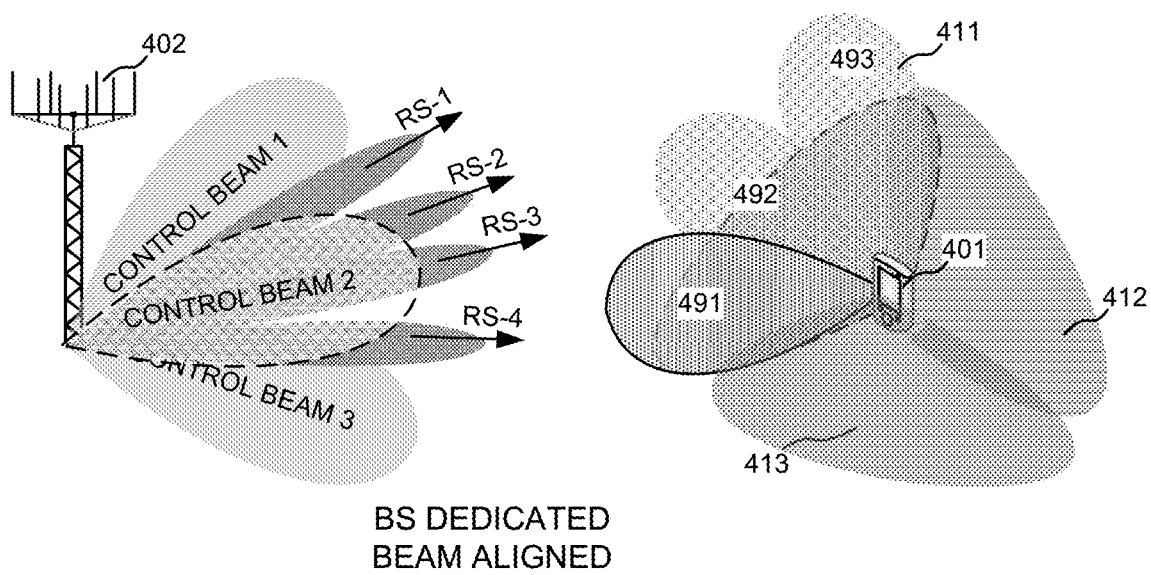
FIG. 4B illustrates exemplary beam manage for multiple TX-RX beams where the base station RS beam is aligned.

FIG. 4A illustrates exemplary beam management for multiple TX-RX beams where the preferred control beam being identified. A UE 401 performs measurements of TX beams from an eNB 402. In this example, eNB 402 has four control beams including control-beam-1, control-beam-2, control-beam-3, and control-beam-4. UE 401 has three RX beams, 411, 412, and 413. UE 401 performs time-division measurement of each TX beams of one RX beam, and switches to the next RX beam upon finishing all the TX beams. Once UE 401 measures all TX beams with each RX beams, the UE obtains measurement results for each TX-RX pair. In one embodiment, a preferred control beam is identified. In another embodiment, once UE 401 identifies the preferred TX control beam and RX beam pair, the UE can further divide the RX beam to multiple smaller RX beams and performs TX-RX measurements using the smaller RX beams of the identified preferred RX beam. FIG. 4B illustrates exemplary beam manage for multiple TX-RX beams where the base station RS beam is aligned. As shown in FIG. 4B, the preferred TX beam is control-beam-2 and the preferred RX beam is beam 411. Beam 411 can be further divided into beams 491, 492, and 493. Thereafter, UE 401 performs measurement of TX control-beam-2 with RX beams 491, 492, and 493. UE 401 identifies RX beam 491 as the preferred RX beam. In another embodiment, the UE performs TX-RX measurement with smaller beams without taking the two-step measurement.

The HF/NR wireless heterogeneity system can have different deployment arrangements. In one embodiment, multiple transmission points (TRPs) are deployed where the cell is covered by multiple TRPs. In another embodiment, single TRP deployment is used where the cell is covered by single TRP. In the HF wireless system deployment, there are two types of heterogeneity in the deployment, including the standalone type and the micro-cell assistance type. In definition of a heterogeneous network, there are two levels of heterogeneities, namely the spectrum heterogeneity and the deployment heterogeneity. For the spectrum heterogeneity, the HF bands provide a massive amount of bandwidths for data transmission enabling very high data rates; microwave bands are used for control message (such as RRC message) exchange, demanding lower data rates but higher reliability. For the deployment heterogeneity: the microwave bands through omnidirectional transmission/reception provide macro cells; HF bands through high directional transmission/reception provide small cells. The HF base station can be either standalone or non-standalone. If the HF base station is standalone, it is a full-function eNB, which has S1 interface towards the core network and can provide service to users alone. UE can camp on the HF cell and initiates access to it.

If the HF base station is non-standalone, UE can utilize the HF radio resources only after the RRC connection is established. The integration of HF band and microwave band can be achieved by different approaches in different layers, including integration in PHY through carrier aggregation, integration in higher layer through dual connectivity (DC), and integration in the core network.

Figure 5:
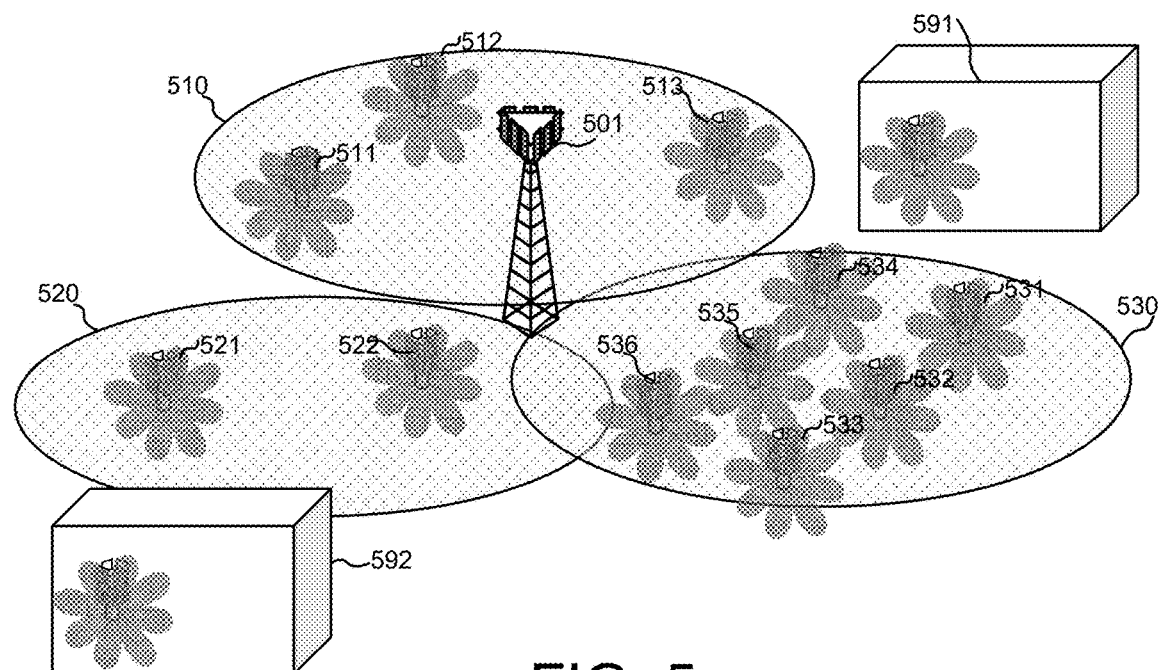
FIG. 5 shows an exemplary diagram of single TRP deployment in accordance with embodiments of the current invention.

FIG. 5 shows an exemplary diagram of single TRP deployment in accordance with embodiments of the current invention. Area 510, 520 and 530 are served by multiple HF base stations. Area 510 includes HF base stations 511, 512, and 513. Area 520 includes HF base stations 521 and 522. Area 530 includes HF base stations 531, 532, 533, 534, 535, and 536. A macro-cell base station 501 assists the non-standalone HF base stations. FIG. 5 also shows two exemplary standalone HF base stations, 591 and 592.

Figure 6:
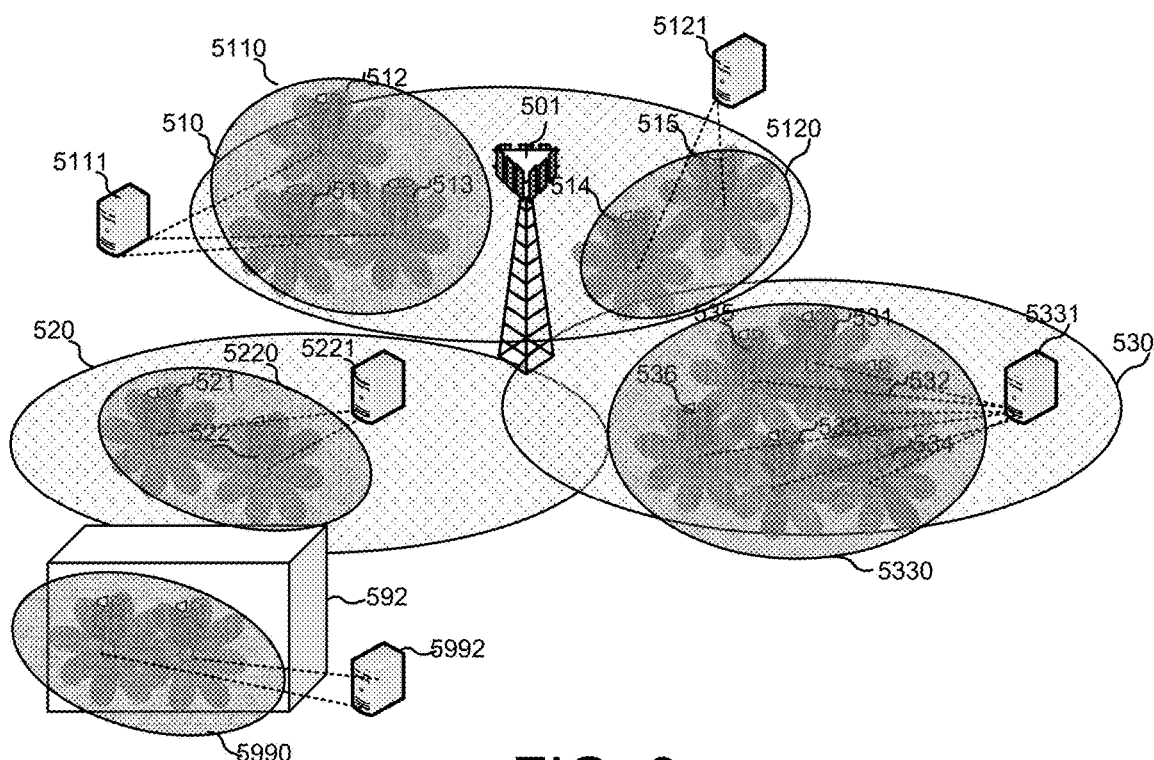
FIG. 6 shows an exemplary diagram of multiple-TRP deployment in accordance with embodiments of the current invention.

FIG. 6 shows an exemplary diagram of multiple-TRP deployment in accordance with embodiments of the current invention.

Area 510, 520 and 530 are served by multiple HF base stations, some forming multiple cells by multiple-TRP deployment. In the multiple-TRP deployment, multiple TRPs are connected to the 5G node through ideal backhaul/fronthaul. With multiple-TRP deployment, the cell size is scalable and can be very large. Area 510, 520 and 530 are served by one or more multiple-TRP cells. Area 510 is served by two multiple-TRP cells 5110 and 5120. Multiple TRPs 511, 512, and 513 are connected with a 5G node 5111 forming cell 5110. Multiple TRPs 514, and 515 are connected with a 5G node 5121 forming cell 5120. Similarly, area 520 is served by a multiple-TRP cell 5220. Multiple TRPs 521, and 522 are connected with a 5G node 5221 forming cell 5220. Area 530 is served by a multiple-TRP cell 5330. Multiple TRPs 531-536 are connected with a 5G node 5331 forming cell 5330. Standalone cell can also be formed with multiple-TRPs. Multiple TRPs are connected with a 5G node 5992 forming standalone cell 5990.

Figure 7:
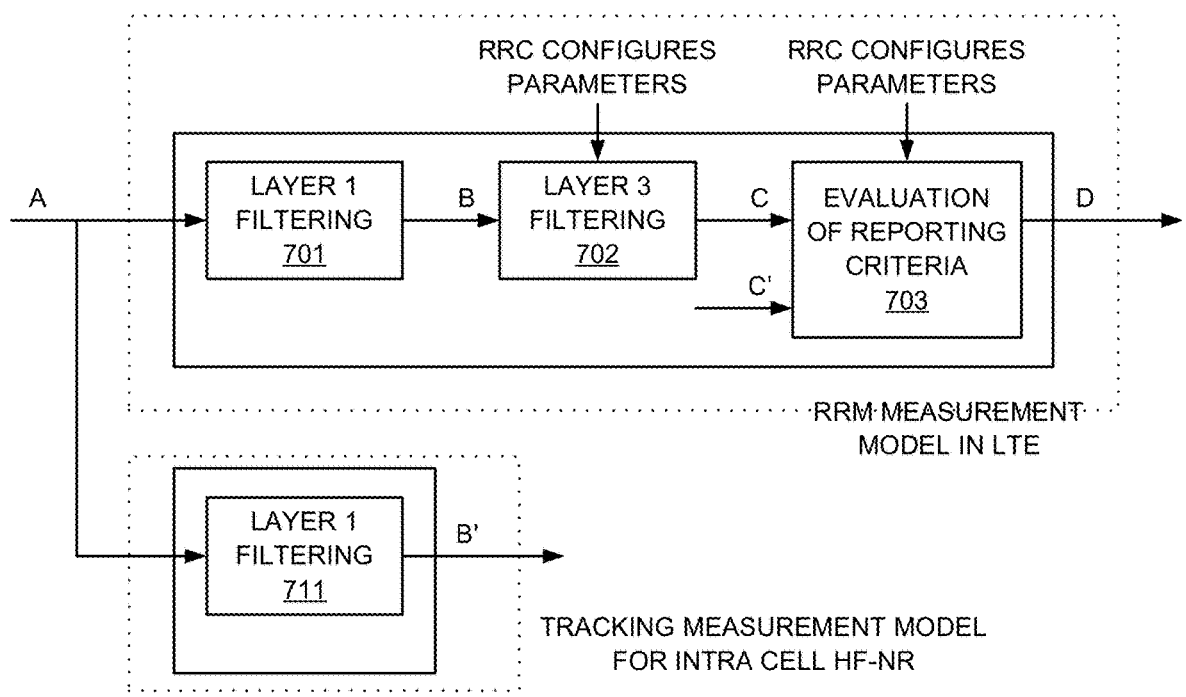
FIG. 7 shows an exemplary flow diagram of the RRM measurement model for multiple TX beam and multiple RX beams in accordance with embodiments of the current invention.

FIG. 7 shows an exemplary flow diagram of the RRM measurement model for multiple TX beam and multiple RX beams in accordance with embodiments of the current invention. Input A is passed to layer-1 filtering 701 outputs B. Outputs B is passed to layer-3 filtering 702. Layer-3 filter 702 has RRC configured parameters for the layer-3 filtering. The filtered results C are passed to evaluation of reporting criteria 703. A threshold C' is used by the evaluation procedure 703, which is configured with parameters from RRC. Based on the RRC configuration parameters, in block, C and C' are possessed to evaluate the reporting criteria, and to generate output denoted as D. Inputs A, pass through layer-1 filtering 711 and output B', which is used to track measurements.

Figure 8:
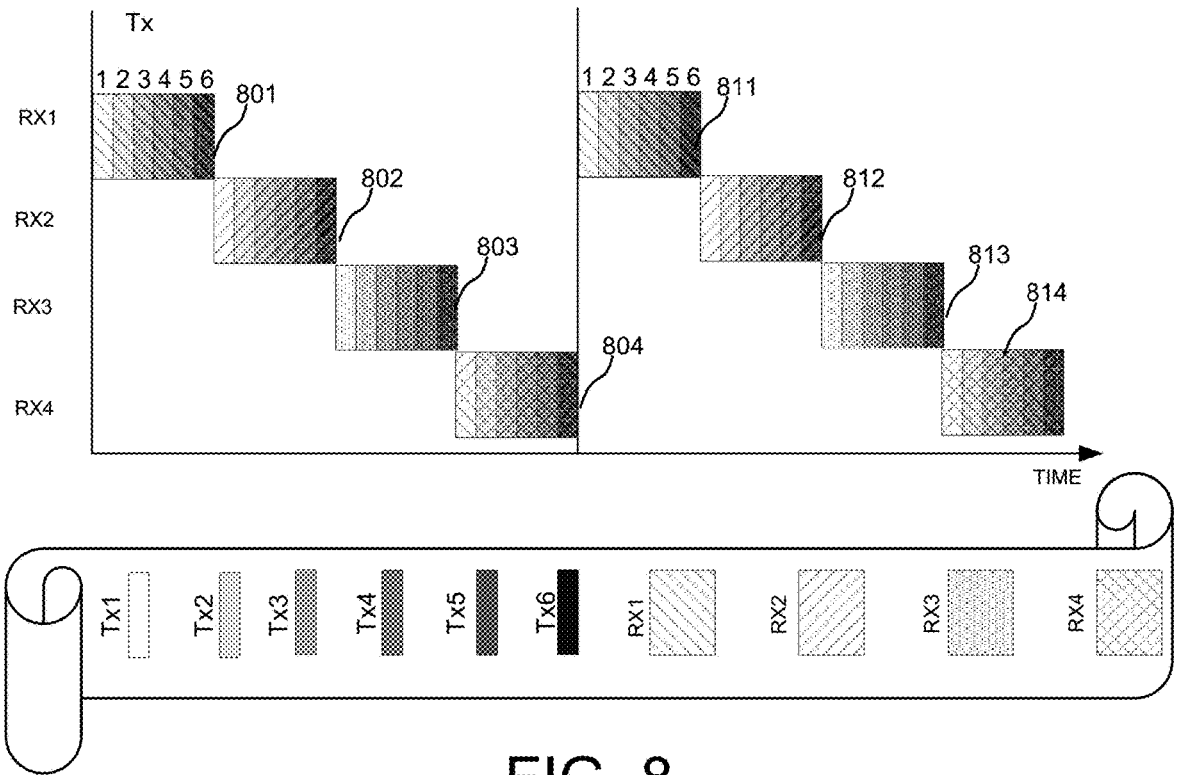
FIG. 8 shows an exemplary diagram of multiple TX-RX beam pair measurements in accordance with embodiments of the current invention.

FIG. 8 shows an exemplary diagram of multiple TX-RX beam pair measurements in accordance with embodiments of the current invention. Six TX beams beam-1 through beam-6 are measured with each RX beams, RX1, RX2, RX3, and RX4. Measurements 801 contain measurement samples of TX1-RX1, TX2-RX1, TX3-RX1, TX4-RX1, TX5-RX1, and TX6-RX1. Similarly, Measurements 802 contain measurement samples of TX1-RX2, TX2-RX2, TX3-RX2, TX4-RX2, TX5-RX2, and TX6-RX2. Measurements 803 and 804 are obtained by RX3 and RX4. Subsequently, the procedure is repeated generating measurement samples 811, 812, 813, and 814. Unlike in traditional LTE system, whose measurement is performed on one wide sector or a cell with omnidirectional TX and RX, multiple TX-RX pairs are measured. How to utilize the measurement results for multiple TX-RX pairs needs to be considered for cell quality evaluation.

Figure 9:
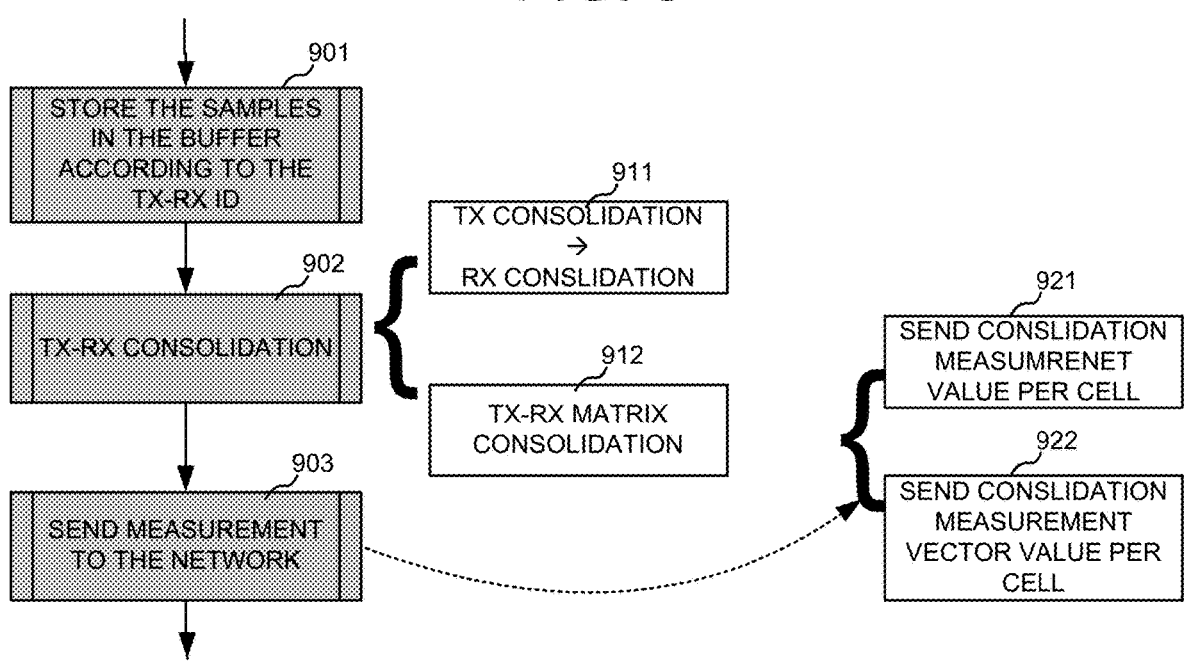
FIG. 9 shows an exemplary flow diagram of the top level RRM measurement for the HF/NR system in accordance with embodiments of the current invention.

FIG. 9 shows an exemplary flow diagram of the top level RRM measurement for the HF/NR system in accordance with embodiments of the current invention. At step 901, the UE stores the samples in the buffer according to the TX-RX IDs. At step 902, the UE performs TX-RX consolidation. At step 903, the UE sends measurement reports to the network. In one embodiment, step 902 involves performing a TX consolidation followed by a RX consolidation in step 911. In another embodiment, the UE performs TX-RX matrix consolidation as shown in step 912. In yet another embodiment, the measurement report contains the consolidated value for each cell. In one embodiment, the measurement report contains a consolidation TX vector. Subsequently, the network performs its own consolidation based on the received TX vector and sends a consolidation result to the UE. in another embodiment, the step 903 comprises: in one case, sending the consolidation measurement value per cell in step 921, or sending the consolidation measurement vector value per cell in step 922.

Since the NR system requires multiple TX-RX pair measurement, the UE performs the measurements, stores the results in measurement matrix, and performs consolidation and filtering based on the stored measurement matrix.

Figure 10:
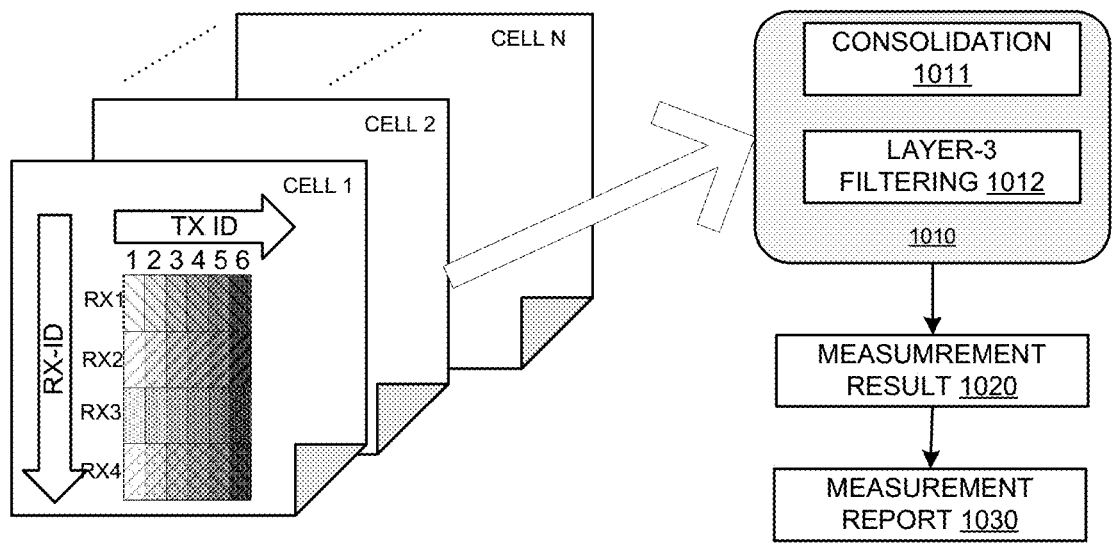
FIG. 10 shows an exemplary diagram of the measurement result management in accordance with embodiments of the current invention.

FIG. 10 shows an exemplary diagram of the measurement result management in accordance with embodiments of the current invention. A matrix is required to store the PHY measurement results. The measurement matrix is indexed by the TX-beam ID and the RX-beam ID. Different cells have different matrices. In one embodiment, each column of the measurement matrix corresponding to a TX beam, while each row of the measurement matrix corresponding to a RX beam. In one embodiment, as the UE continuously obtains measurement results, a cyclic buffer is used for measurement storage. The cyclic buffer stores samples for one or multiple periodicities. The stored measurements are passed for process at block 1010. In one embodiment, block 1010 includes a consolidation process 1011 and a layer-3 filter 1012. The processed result is passed to a measurement result block 1020. The measurement result block 1020 evaluates the measurement results and determines whether a measurement report should be sent. In one embodiment, the measurement report is sent to the network if one or more predefined conditions are met. The predefined conditions are the measurement report triggering events, which are known as the following events.

Event A1 (Serving becomes better than threshold)
Event A2 (Serving becomes worse than threshold)
Event A3 (Neighbor becomes offset better than PCell/PSCell)
Event A4 (Neighbor becomes better than threshold)

Event A5 (PCell/PSCell becomes worse than threshold1 and neighbor becomes better than threshold2)

Event A6 (Neighbor becomes offset better than SCell)

Event B1 (Inter RAT neighbor becomes better than threshold)

Event B2 (PCell becomes worse than threshold1 and inter RAT neighbor becomes better than threshold2)

Event C1 (CSI-RS resource becomes better than threshold)

Event C2 (CSI-RS resource becomes offset better than reference CSI-RS resource)

The cell quality evaluation and triggering criteria should be defined based on the consolidated measurement result at the UE side. Therefore, the offset, threshold, as well as the cell quality are defined based on the consolidated measurement result. At block 1030, the measurement report is sent to the network.

Figure 11:
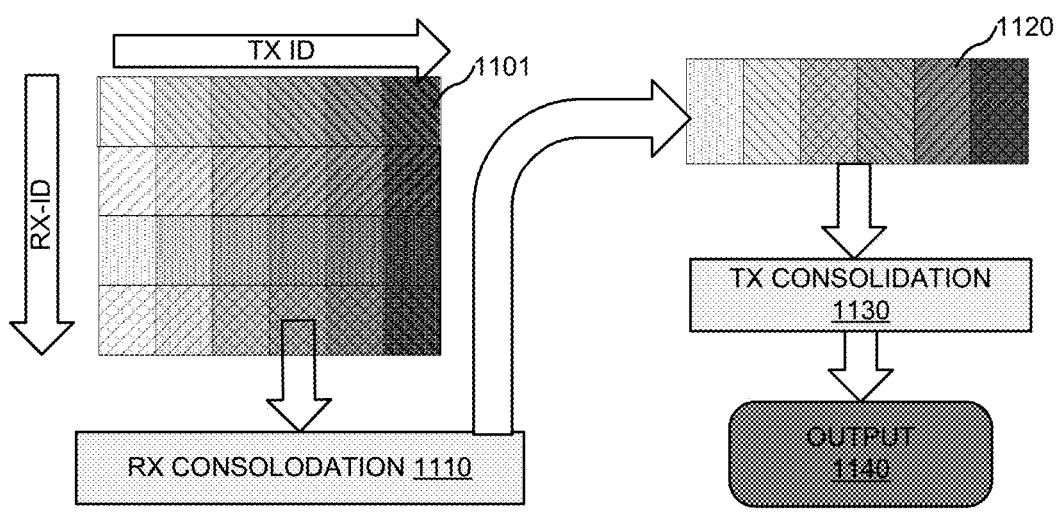
FIG. 11 shows an exemplary diagram for a separate consolidation procedure in accordance with embodiments of the current invention.

FIG. 11 shows an exemplary diagram for a separate consolidation procedure in accordance with embodiments of the current invention. A stored measurement 1101 indexed by TX-ID and RX-ID is processed with a separate consolidation procedure. At step 1110, the RX consolidation is performed. For each TX beam, the measurement results for all RX beams are consolidated and one value for the TX beam is derived. In obtaining the consolidated value, different consolidation rules are applied. After the RX consolidation, a vector 1120 is generated. Vector 1120 contains the RX consolidated results with each element corresponding to a TX beam. For each cell, in step 1130, the vector containing measurements results for all the TX beams are consolidated and one value for the cell is derived. In Step 1140, generating the consolidated measurement result output. In one embodiment, the TX consolidation involves selecting the TX beam for consolidation based on the network decision and input. In one embodiment, only the measurement result of the serving beam in the single connectivity is used. The serving beam is determined by the network and beam switching is commanded by the network. Based on the switching command, the UE picks the measurement result in the vector according to the serving beam ID. In yet another embodiment, the consolidation rules for the serving cell and the neighboring cells are different. For example, the UE always picks the serving beam as the consolidation result for the serving cell. The UE uses a set of TX beams for consolidation for neighboring cells, such as picking the best beam of the neighboring cells as the consolidation result.

Figure 12:
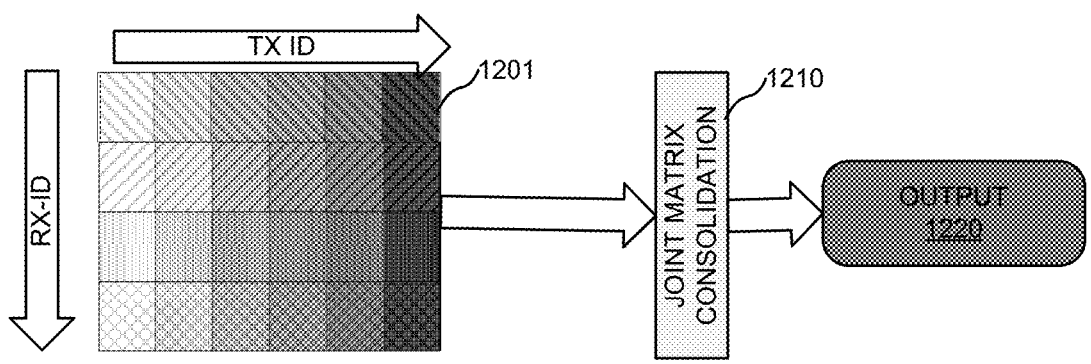
FIG. 12 shows an exemplary diagram for a joint consolidation procedure in accordance with embodiments of the current invention.

FIG. 12 shows an exemplary diagram for a joint consolidation procedure in accordance with embodiments of the current invention. A stored measurement 1201 indexed by TX-ID and RX-ID is processed with a joint consolidation procedure. In step 1210, the joint matrix consolidation is performed. In Step 1220, generating the consolidated measurement result output. The matrix of the measurement results with each element corresponding to a TX-RX pair is consolidated. One value is derived for each cell. Different consolidation rules can be applied to generate the consolidation value. In one embodiment, the measurement result with the TX-RX pair of the best RSRP is selected. In another embodiment, the number of elements with measurement result of the TX-RX pairs above a certain threshold is used. In yet another embodiment the mean value of the measurement results for all TX-RX pair is used. In another embodiment, the sum value of measurement results for all TX-RX pairs is used. In one embodiment, only TX-RX pair with measurement above a certain threshold is used for the consolidation.

To generate the measurement result, the layer-3 filtering is used. There are two options. The first is filter first and subsequently, consolidate. In this option, the UE applies layer-3 filter on the measurement results for each beam. The filtered results for each beam can be derived. The UE applies consolidation on the filtered results. The second option is consolidation first and then filtering. In the second option, the UE applies consolidation on the measurement results for the set of the control beams. The consolidated results for the set of control beams can be derived. The UE applies layer-3 filter on the consolidated results.

FIGS. 13-17 illustrates different embodiments of the consolidation and filtering procedure.

Figure 13:
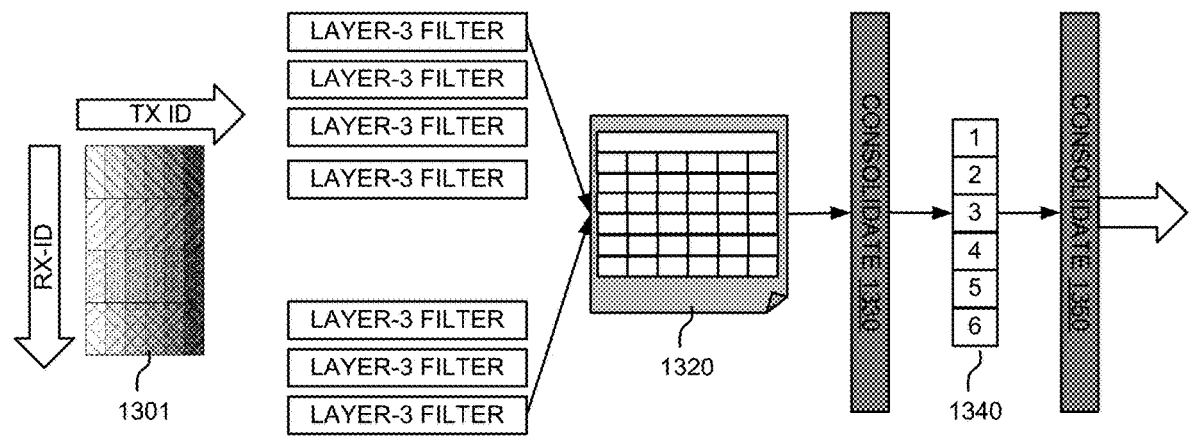
FIG. 13 shows an exemplary diagram of filter first followed by the consolidation with intermediate vectors in accordance with embodiments of the current invention.

FIG. 13 shows an exemplary diagram of filter first followed by the consolidation with intermediate vectors in accordance with embodiments of the current invention. A TX-RX measurement matrix 1301 is indexed by the TX-ID and the RX-ID. The UE applies layer-3 filtering on the measurement results for each TX-RX pair. The filtered results for each TX-RX pair is derived and stored in a matrix 1320. At step 1330, the UE applies the first consolidation to matrix 1320 and generates a consolidated vector 1340. In one embodiment, 1330 is a RX consolidation. In another embodiment, 1330 is a TX consolidation. In step 1350, a second consolidation applies to vector 1330 and generates the measurement result.

Figure 14:
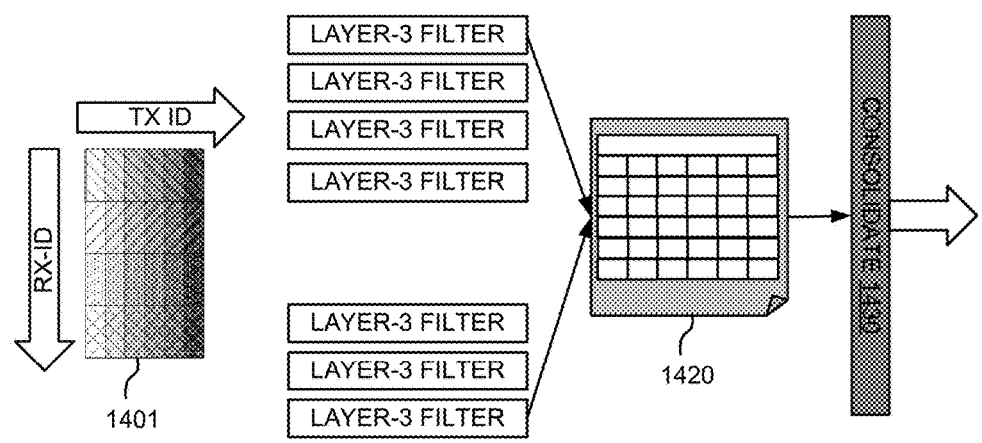
FIG. 14 shows an exemplary diagram of filtering each TX-RX pair first followed by the consolidation in accordance with embodiments of the current invention.

FIG. 14 shows an exemplary diagram of filtering each TX-RX pair first followed by the consolidation in accordance with embodiments of the current invention. A TX-RX measurement matrix 1401 is indexed by the TX-ID and the RX-ID. The UE applies layer-3 filtering on the measurement results for each TX-RX pair. The filtered results for each TX-RX pair is derived and stored in a matrix 1420. At step 1430, the UE applies joint consolidation on matrix 1420 and generates the measurement result.

Figure 15:
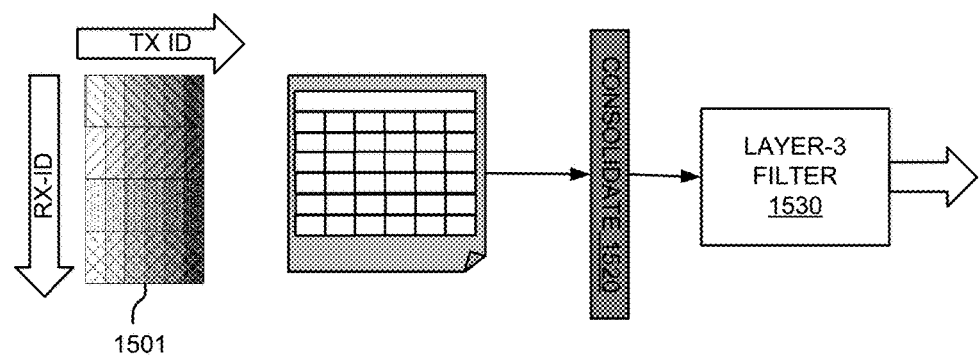
FIG. 15 shows an exemplary diagram of consolidating each TX-RX pair first followed by the layer-3 filtering in accordance with embodiments of the current invention.

FIG. 15 shows an exemplary diagram of consolidating each TX-RX pair first followed by the layer-3 filtering in accordance with embodiments of the current invention. A TX-RX measurement matrix 1501 is indexed by the TX-ID and the RX-ID. At step 1520, the UE applies consolidation on the measurement for all the TX-RX pairs. The consolidated results for all TX-RX pairs can be derived. At step 1530, the UE applies layer-3 filter on the consolidated results and generates the measurement result.

Figure 16:
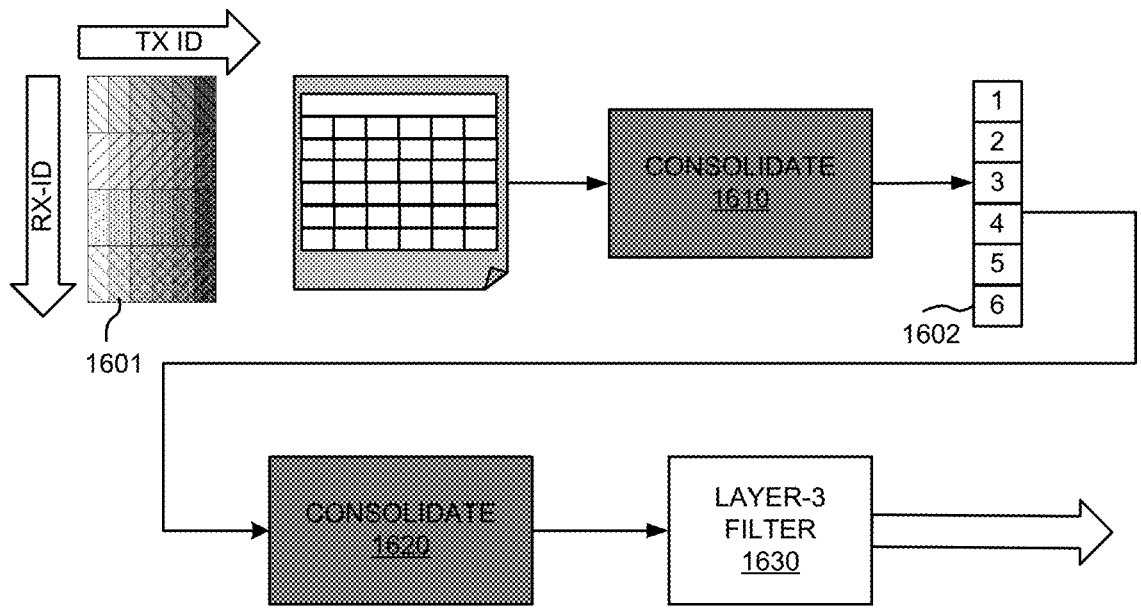
FIG. 16 shows an exemplary diagram of separation consolidation first followed by the filtering in accordance with embodiments of the current invention.

FIG. 16 shows an exemplary diagram of separation consolidation first followed by the filtering in accordance with embodiments of the current invention. A TX-RX measurement matrix 1601 is indexed by the TX-ID and the RX-ID. At step 1610, the UE applies consolidation on the measurement results for the TX-RX pairs. The consolidation results for the TX beam can be derived. The UE generates a vector 1602. At step 1620, the UE applies a second consolidation to vector 1602. At step 1630, the UE applies layer-3 filter on the consolidated results and generates the measurement results.

Figure 17:
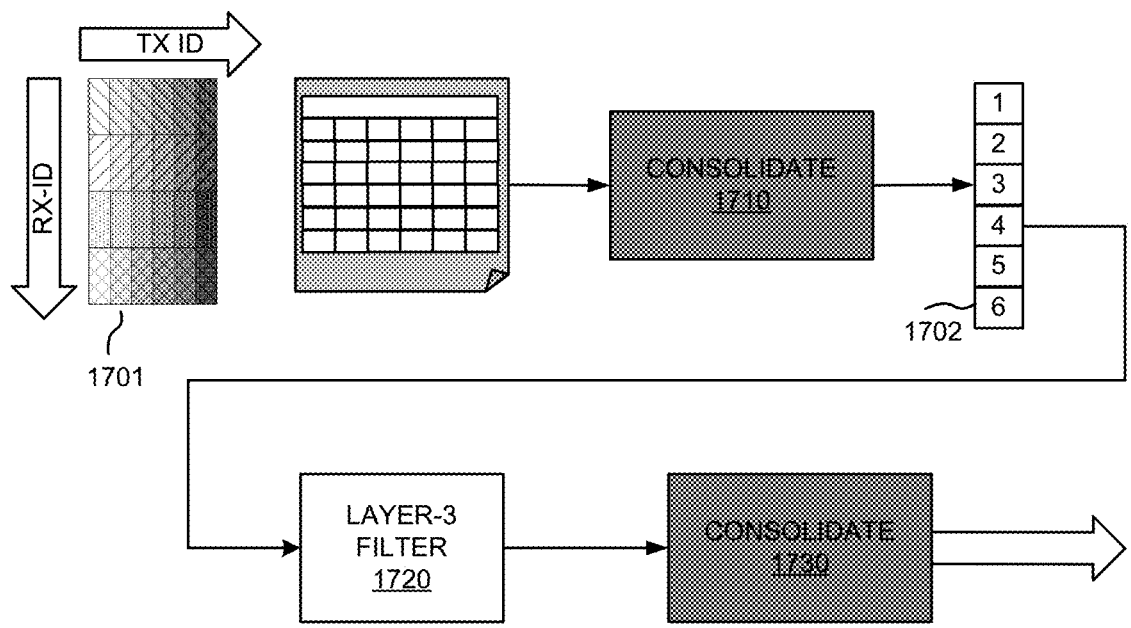
FIG. 17 shows an exemplary diagram of filtering between two separate consolidations in accordance with embodiments of the current invention.

FIG. 17 shows an exemplary diagram of filtering between two separate consolidations in accordance with embodiments of the current invention. A TX-RX measurement matrix 1701 is indexed by the TX-ID and the RX-ID. At step 1710, the UE applies the Rx consolidation on the measurement results for the TX-RX pairs. The consolidation results for each TX beam can be derived. The UE generates a vector 1702. At step 1720, the UE applies layer-3 filter on vector 1702. At step 1730, the UE applies TX consolidation and generates the measurement results.

Figure 18:
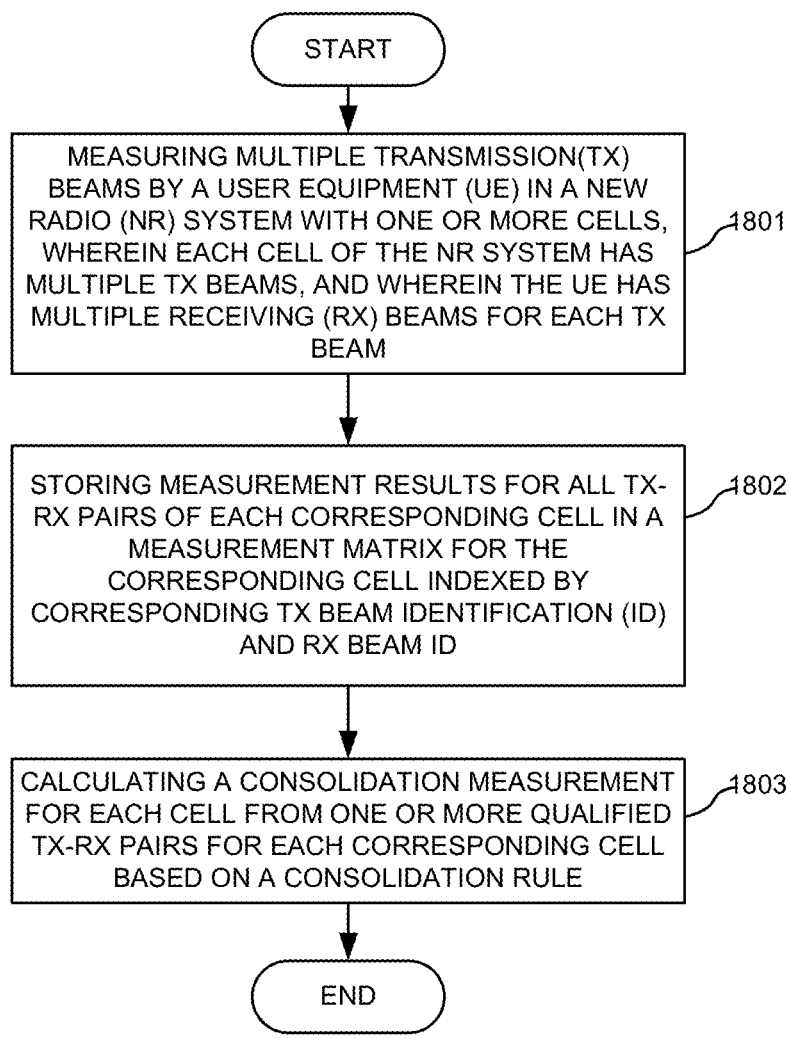
FIG. 18 is an exemplary flow chart for the RRM measurement in the NR system with beamforming in accordance with embodiments of the current invention.

FIG. 18 is an exemplary flow chart for the RRM measurement in the NR system with beamforming in accordance with embodiments of the current invention. At step 1801, the UE measures multiple transmission (TX) beams in a new radio (NR) system with one or more cells, wherein each cell of the NR system has multiple TX beams, and wherein the UE has multiple receiving (RX) beams for each TX beam. At step 1802, the UE stores measurement results for all TX-RX pairs of each corresponding cell in a measurement matrix for the corresponding cell indexed by corresponding TX beam identification (ID) and RX beam ID. At step 1803, the UE calculates a consolidation measurement for each cell from one or more qualified TX-RX pairs for each corresponding cell based on a consolidation rule.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   measuring multiple transmission (TX) beams by a user equipment (UE) in a new radio (NR) system with multiple cells, wherein each cell of the NR system has multiple TX beams, and wherein the UE has multiple receiving (RX) beams for each TX beam;
   storing measurement results for all TX-RX pairs of each corresponding cell in a measurement matrix for the corresponding cell indexed by corresponding TX beam identification (ID) and RX beam ID;
   calculating a consolidation measurement for each cell from one or more qualified TX-RX pairs for each corresponding cell based on a consolidation rule;
   generating a measurement report based the consolidated measurement result; and
   sending the measurement report to the NR network.

2. The method of claim 1, wherein the consolidation rule indicates generating a RX consolidated vector for a cell by consolidating all RX beams of the cell with the same TX beam ID, and subsequently, generating the consolidation measurement for the cell based on the RX consolidated vector for the cell.

3. The method of claim 1, wherein the consolidation rule is selected from a set of matrix consolidation rules comprising: selecting the measurement result of a TX-RX pair with the best RSRP, a number of TX-RX pairs with corresponding measurement result above a threshold, a mean value of the measurement results for all TX-RX pairs or all the TX-RX pairs above a threshold for corresponding cell, a sum value of the measurement results for all TX-RX pairs for corresponding cell or all the TX-RX pairs above a threshold.

4. The method of claim 1, wherein calculating the consolidation measurement for each cell involves:
   performing a layer-3 filter on each TX-RX pair of corresponding cell measurement matrix and generating filtered measurement matrix; and
   subsequently, performing a consolidation on the filtered measurement matrix by applying separate consolidation and generating a consolidated vector.

5. The method of claim 1, wherein calculating the consolidation measurement for each cell involves:
   performing a layer-3 filter on each TX-RX pair of corresponding cell measurement matrix and generating filtered measurement matrix; and
   subsequently performing a consolidation on the filtered measurement matrix by applying joint consolidation and generating the consolidation measurement.

6. The method of claim 1, wherein calculating the consolidation measurement for each cell involves:
   performing a consolidation on the measurement matrix for TX-RX pairs of corresponding cell and generating a consolidated vector indexed by TX IDs; and
   subsequently, performing a layer-3 filter on the consolidated vector and performing consolidation on the filtered vector to generate the consolidated measurement for the corresponding cell.

7. The method of claim 1, wherein calculating the consolidation measurement for each cell involves:
   performing a consolidation on the measurement matrix for TX-RX pairs of corresponding cell and generating a consolidated vector indexed by TX IDs followed by a second consolidation to generate a consolidated value; and
   subsequently, performing a layer-3 filter on the consolidated value to generate the consolidated measurement for the corresponding cell.

8. The method of claim 1, wherein calculating the consolidation measurement for each cell involves:
   performing a consolidation on the measurement matrix for TX-RX pairs of corresponding cell and generating a consolidated value; and
   subsequently, performing a layer-3 filter on the consolidated value to generate the consolidated measurement for the corresponding cell.

9. The method of claim 1, wherein the measurement report includes the consolidated result.

10. The method of claim 1, wherein the measurement report includes a measurement vector indexed by TX IDs, wherein each element of the measurement vector is a consolidated result of all TX-RX pairs with the same TX IDs.

11. The method of claim 10, further comprising: receiving a consolidated measurement result for one or more cells from the network, wherein the received consolidated measurement result for each cell is derived by the network based on the measurement vector sent by the UE.

12. An user equipment (UE), comprising:
   a transceiver that transmits and receives new radio (NR) signals from multiple NR cells in a NR system, wherein each NR cell has multiple transmission (TX) beams;
   a multiple beam receiver that receives each TX beam with multiple receiving (RX) beamforming;
   a beam measurement handler that measures multiple TX beams with multiple RX beams;
   a measurement storage manager that stores measurement results for all TX-RX pairs of each corresponding cell in a measurement matrix for the corresponding cell indexed by corresponding TX beam identification (ID) and RX beam ID;
   a measurement calculator that calculates a consolidation measurement for each cell from one or more qualified TX-RX pairs for each corresponding cell based on a consolidation rule; and
   a measurement reporter that generates a measurement report based the consolidated measurement result and sends the measurement report to the NR network.

13. The UE of claim 12, wherein the consolidation rule indicates generating a RX consolidated vector for a cell by consolidating all RX beams of the cell with the same TX beam ID, and subsequently, generating the consolidation measurement for the cell based on the RX consolidated vector for the cell.

14. The UE of claim 12, wherein the consolidation rule is selected from a set of matrix consolidation rules comprising: selecting the measurement result of a TX-RX pair with the best RSRP, a number of TX-RX pairs with corresponding measurement result above a threshold, a mean value of the measurement results for all TX-RX pairs or all the TX-RX pairs above a threshold for corresponding cell, a sum value of the measurement results for all TX-RX pairs or all the TX-RX pairs above a threshold for corresponding cell.

15. The UE of claim 12, wherein calculating the consolidation measurement for each cell involves:
performing a layer-3 filter on each TX-RX pair of corresponding cell measurement matrix and generating filtered measurement matrix; and
subsequently, performing a consolidation on the filtered measurement matrix by applying separate consolidation and generating a consolidated vector.

16. The UE of claim 12, wherein calculating the consolidation measurement for each cell involves:
performing a layer-3 filter on each TX-RX pair of corresponding cell measurement matrix and generating filtered measurement matrix; and
subsequently, performing a consolidation on the filtered measurement matrix by applying joint consolidation and generating the consolidation measurement.

17. The UE of claim 12, wherein calculating the consolidation measurement for each cell involves:
performing a consolidation on the measurement matrix for TX-RX pairs of corresponding cell and generating a consolidated vector indexed by TX IDs; and
subsequently, performing a layer-3 filter on the consolidated vector and performing consolidation on the filtered vector to generate the consolidated measurement for the corresponding cell.

18. The UE of claim 12, wherein calculating the consolidation measurement for each cell involves:
performing a consolidation on the measurement matrix for TX-RX pairs of corresponding cell and generating a consolidated vector indexed by TX IDs followed by a second consolidation to generate a consolidated value; and
subsequently, performing a layer-3 filter on the consolidated value to generate the consolidated measurement for the corresponding cell.

19. The UE of claim 18, wherein calculating the consolidation measurement for each cell involves:
performing a consolidation on the measurement matrix for TX-RX pairs of corresponding cell and generating a consolidated value; and
subsequently, performing a layer-3 filter on the consolidated value to generate the consolidated measurement for the corresponding cell.

20. The UE of claim 12, wherein the measurement report includes the consolidated result.

21. The UE of claim 12, wherein the measurement report includes a measurement vector indexed by TX IDs, wherein each element of the measurement vector is a consolidated result of all TX-RX pairs with the same TX IDs.

22. The UE of claim 21, further comprising: a network measurement receiver that receives a consolidated measurement result for one or more cells from the network, wherein the received consolidated measurement result for each cell is derived by the network based on the measurement vector sent by the UE.

\* \* \* \* \*